(12) United States Patent
Salle et al.

(10) Patent No.: US 9,240,931 B2
(45) Date of Patent: Jan. 19, 2016

(54) INFORMATION TECHNOLOGY SERVICE MANAGEMENT

(75) Inventors: Mathias Salle, San Francisco, CA (US); Erik L. Eidt, Campbell, CA (US)

(73) Assignee: Hewlett Parkard Enterprise Development LP, Houston, TX (US)

( * ) Notice: Subject to any disclaimer, the term of this patent is extended or adjusted under 35 U.S.C. 154(b) by 224 days.

(21) Appl. No.: 13/812,585

(22) PCT Filed: Jul. 30, 2010

(86) PCT No.: PCT/US2010/043913
§ 371 (c)(1),
(2), (4) Date: Jan. 28, 2013

(87) PCT Pub. No.: WO2012/015425
PCT Pub. Date: Feb. 2, 2012

(65) Prior Publication Data
US 2013/0132534 A1    May 23, 2013

(51) Int. Cl.
*H04L 12/26* (2006.01)
*G06F 11/07* (2006.01)
*H04L 12/24* (2006.01)

(52) U.S. Cl.
CPC ............ *H04L 43/00* (2013.01); *G06F 11/0751* (2013.01); *H04L 41/0866* (2013.01); *G06F 11/0757* (2013.01)

(58) Field of Classification Search
CPC ......... G06F 9/445; G06F 17/30; G06F 15/16; G06F 19/00; G06F 11/0751; G06F 11/0757; H04L 12/26; H04L 43/00; H04L 41/086
USPC .................................. 709/203, 206, 223, 226
See application file for complete search history.

(56) References Cited

U.S. PATENT DOCUMENTS 5,893,905 A * 4/1999 Main et al. ................... 705/7.38
7,451,201 B2   11/2008 Alex et al.
(Continued)

FOREIGN PATENT DOCUMENTS

| CN | 1787524 A | 6/2006 |
| CN | 101694625 A | 4/2010 |

(Continued)

OTHER PUBLICATIONS

The International Search Report and the Written Opinion of the international Searching Authority for International App No. PCT/US2010/043913 dated Apr. 29, 2011, pp. 8.

*Primary Examiner* — Ebrahim Golabbakhsh
(74) *Attorney, Agent, or Firm* — Hewlett Packard Enterprise Patent Department

(57) ABSTRACT

A desired instance of a service model is stored, and an observed instance of the service model is provided. Inconsistencies between the desired instance and the observed instance may be detected based on a comparison between the desired instance and the observed instance.

20 Claims, 3 Drawing Sheets

(56) References Cited

U.S. PATENT DOCUMENTS

| | | | |
|---|---|---|---|
| 7,493,528 B1 | 2/2009 | Reichert et al. | |
| 7,707,015 B2 * | 4/2010 | Lubrecht et al. | 703/6 |
| 2003/0051128 A1 | 3/2003 | Rodriguez et al. | |
| 2003/0208523 A1 * | 11/2003 | Gopalan et al. | 709/201 |
| 2003/0221189 A1 | 11/2003 | Birum et al. | |
| 2003/0233446 A1 * | 12/2003 | Earl | 709/224 |
| 2007/0192453 A1 | 8/2007 | Copeland et al. | |
| 2009/0132611 A1 | 5/2009 | Brown et al. | |
| 2009/0158272 A1 | 6/2009 | El-Assir et al. | |
| 2009/0234484 A1 * | 9/2009 | Vacar et al. | 700/110 |
| 2011/0213712 A1 * | 9/2011 | Hadar et al. | 705/80 |
| 2011/0246526 A1 * | 10/2011 | Finkelstein et al. | 707/784 |

FOREIGN PATENT DOCUMENTS

| | | |
|---|---|---|
| CN | 101763568 A | 6/2010 |
| JP | 10171635 A | 6/1998 |

* cited by examiner

Consistency State and Lifecycle State

|  | Consistent | | Inconsistent | |
| --- | --- | --- | --- | --- |
|  | Watched | Not Watched | Watched | Not Watched |
| Inconsistency | Notify | Notify | Notify | Not Notify |
| Consistency | Notify | Not Notify | Notify | Not Notify |

INFORMATION TECHNOLOGY SERVICE MANAGEMENT

BACKGROUND

An information technology (IT) service is composed of a set of hardware and software artifacts deployed in one or more data centers. Availability and performance of such artifacts vary greatly over time. For example, changes can range from reconfiguration of service attributes to upgrade and downgrade, as well as migration, scale out, etc. Typically, these changes are accomplished manually, resulting in unsatisfactory repeatability, speed of execution, cost efficiency, etc.

The Information Technology Infrastructure Library (ITIL) provides a framework for service support. A configuration management is an example of the service support. The configuration management refers to a process for recognizing a configuration item targeted for IT service management to keep, update, confirm, and audit information about the configuration item. The configuration item represents resources targeted for configuration. The configuration item includes not only system resources inclusive of hardware and software but also facilities necessary for providing an IT service, documents such as a description about how to provide IT services, an operating procedure, and a diagram, hardware or software maintenance services, processes, etc.

Some systems provide for IT systems monitoring, but IT systems modeling is less advanced. The Configuration Management Database (CMDB) attempts to capture IT service model instances. However, the CMDB typically is used to store the output of monitoring systems to capture the state of the IT service "as is" in the data center. In other cases, the CMDB is used to store model instances that represent only what the desired IT service should look like.

DETAILED DESCRIPTION

In the following detailed description, reference is made to the accompanying drawings which form a part hereof, and in which is shown by way of illustration specific implementations. It is to be understood that other implementations may be utilized and structural or logical changes may be made without departing from the scope of the present disclosure. The following detailed description, therefore, is not to be taken in a limiting sense, and the scope of this disclosure is defined by the appended claims.

Figure 1:
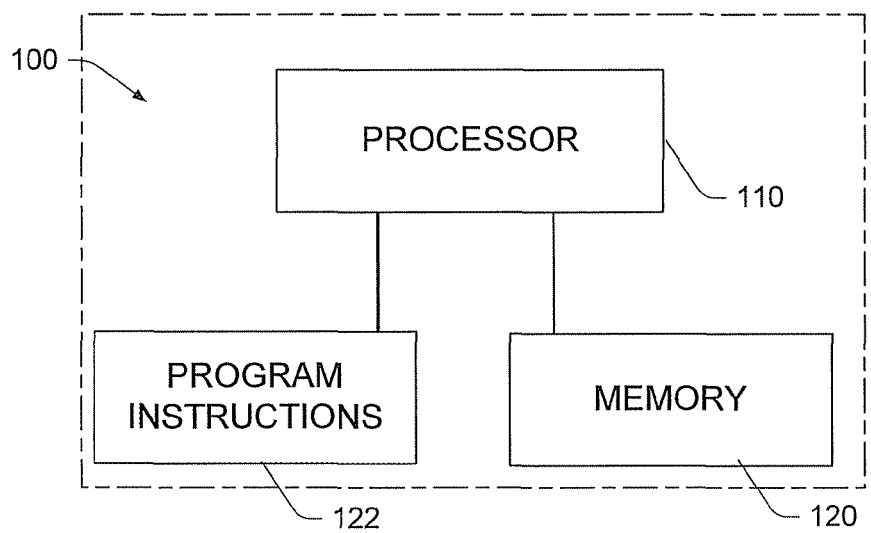
FIG. 1 is a block diagram conceptually illustrating an example of a computer system.

FIG. 1 illustrates a block diagram of an example of a computer system 100. The computer system 100 includes a processor 110 coupled to a memory 120. The memory 120 can be operable to store program instructions 122 that are executable by the processor 110 to perform one or more functions. It should be understood that "computer system" can be intended to encompass any device having a processor that can be capable of executing program instructions from a memory medium. In a particular implementation, the various functions, processes, methods, and operations described herein may be implemented using the computer system 100.

The various functions, processes, methods, and operations performed or executed by the system 100 can be implemented as the program instructions 122 (also referred to as software or simply programs) that are executable by the processor 110 and various types of computer processors, controllers, central processing units, microprocessors, digital signal processors, state machines, programmable logic arrays, and the like. In some implementations, the computer system 100 may be networked (using wired or wireless networks) with other computer systems, and the various components of the system 100 may be local to the processor 110 or coupled thereto via a network.

In various implementations the program instructions 122 may be stored on the memory 120 or any non-transient computer-readable medium for use by or in connection with any computer-related system or method. A computer-readable medium can be an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Implementations of the disclosed IT systems and methods involve desired and observed states in management systems, formalizing the relationship between the characterization of what a model instance is desired to be—the desired state, and what an instance is—the observed state. This two state approach is particularly important in a model based system. A model as used herein generally refers to a representation of the design, characteristics and behavior of a system, element, solution, or service. The model can be a declarative specification of the structural, functional, non-functional, and runtime characteristics of the IT system, element, solution, or service. The instantiation of a model creates a model instance, which is stored as a representation of the model in memory, such as the memory 120.

A service as used herein generally refers a utility or benefit provided by a provider to a consumer. The provider and the consumer may vary by application and may include an enterprise, a business unit, a business process, an application, a third party, an individual, and similar others. Enterprise services may be provided in the course of conducting the enterprise business. IT services generally refer to any application that enables the enterprise to provide utility or benefit by adding functionality to the IT infrastructure.

The model captures the design of a particular IT element or solution, e.g., IT services captured as a service model, defining the externally visible description, behavior, state, and operations available from a service to other services. Thus, the instantiation of a model results in a generation of a virtual runtime object, e.g., the model instance, and also results in a generation of a real, tangible IT artifact in an IT infrastructure, which, for example, could be a data center that includes hardware, software, communications, applications, services and similar other components to provide IT functions.

Figure 2:
FIG. 2 is a block diagram illustrating an example of a two state system with two model instances.

As illustrated in FIG. 2, the theory behind this concept is that an instance of an IT Service exists in two states simultaneously: the desired state 201 and the observed state 202. The observed state is often determined by monitoring systems that continuously observe the IT artifact that is associated with the instance. The desired state is defined when the instance is created and through subsequent changes.

By checking consistency between the desired and observed states, it is possible to detect anomalous IT artifacts. Suppose that a system is characterized by the attribute memoryUtilization defined as being below 95%. The constraint memoryUtilization<95% represents the desired state. Suppose a monitoring probe is deployed to collect memory utilization data at regular intervals and an associated monitoring system updates the observed state with those values. Now suppose at some point in time, the observed state is determined and expressed as memoryUtilization=20%. Clearly, this observed state is consistent with the constraint characterization in the desired state (memoryUtilization<95%). If, at a later time, the observed state changes to memoryUtilization=98%, the desired and observed states clearly are not consistent and will require further actions so that the observed state is returned to a consistent value with the desired state.

Figure 3:
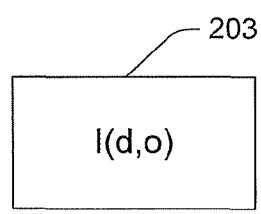
FIG. 3 is a block diagram illustrating an example of a two state system with a single instance representation.
Figure 4:
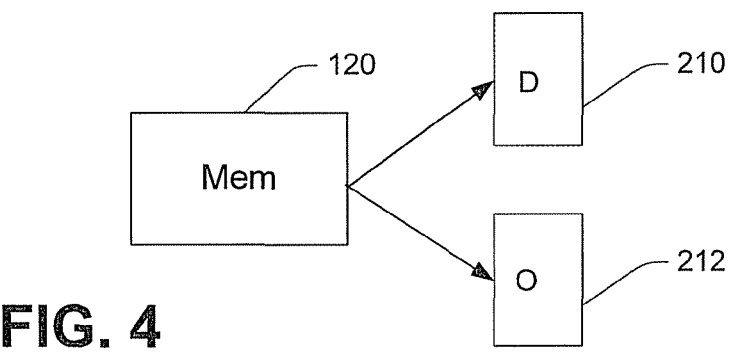
FIG. 4 is a block diagram conceptually illustrating examples of tagged values of a model instance.

Instead of maintaining two representations of an instance, each with one state as shown in FIG. 2, in some implementations a single model instance representation 203 is maintained having two states (i.e. a desired state and an observed state) as illustrated in FIG. 3. In such implementations, model instance elements receive two values, tagged with either a desired (D) or an observed (O) label, the observed value being a refinement of the desired value as illustrated in FIG. 4, where the memory 120 stores the tagged values 210, 212.

Figure 5:
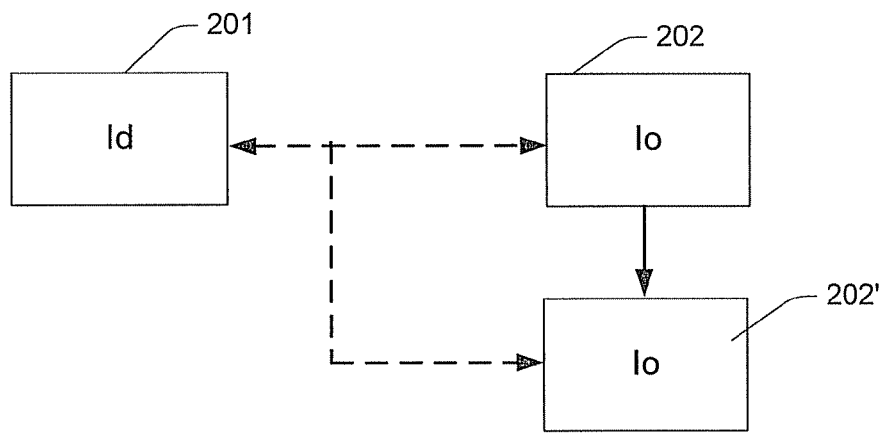
FIG. 5 is a block diagram illustrating examples of transitions between observed states.

Over the course of its lifetime, an IT Service will typically change multiple times. Changes can occur in the observed state (degradation of performance, system failure, etc) or can occur in the desired state. Transitions between observed states reflect changes in the real world. When such a change occurs, a consistency check will verify the correctness of the newly observed states as illustrated in FIG. 5. The desired state 201 is compared to the first observed state 202. Over time, the observed state transitions to the second observed state 202', which is compared to the desired state 201 to verify continued consistency.

Figure 6:
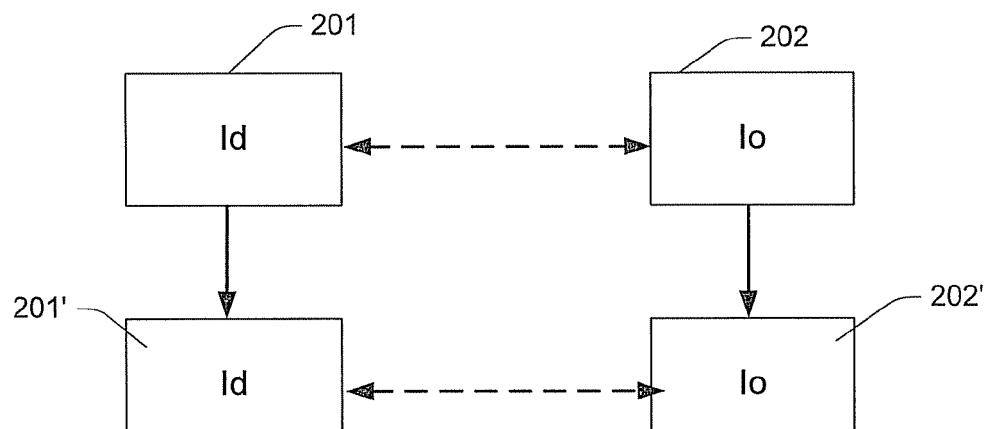
FIG. 6 is a block diagram illustrating an example of a change in a desired state and an example of resulting transitions between observed states.

In contrast, changes in the desired state 201 reflect a conscious decision by an administrator, customer, management system, etc. to alter the IT Service. FIG. 6 illustrates such a change, where the transition from the first desired state 201 to the second, or new desired state 201' is taken first. This transition means that changes in the IT system will be made, resulting in the newly observed state 202'. The two new states 201' and 202' are then checked for consistency.

Figures 7, 8:
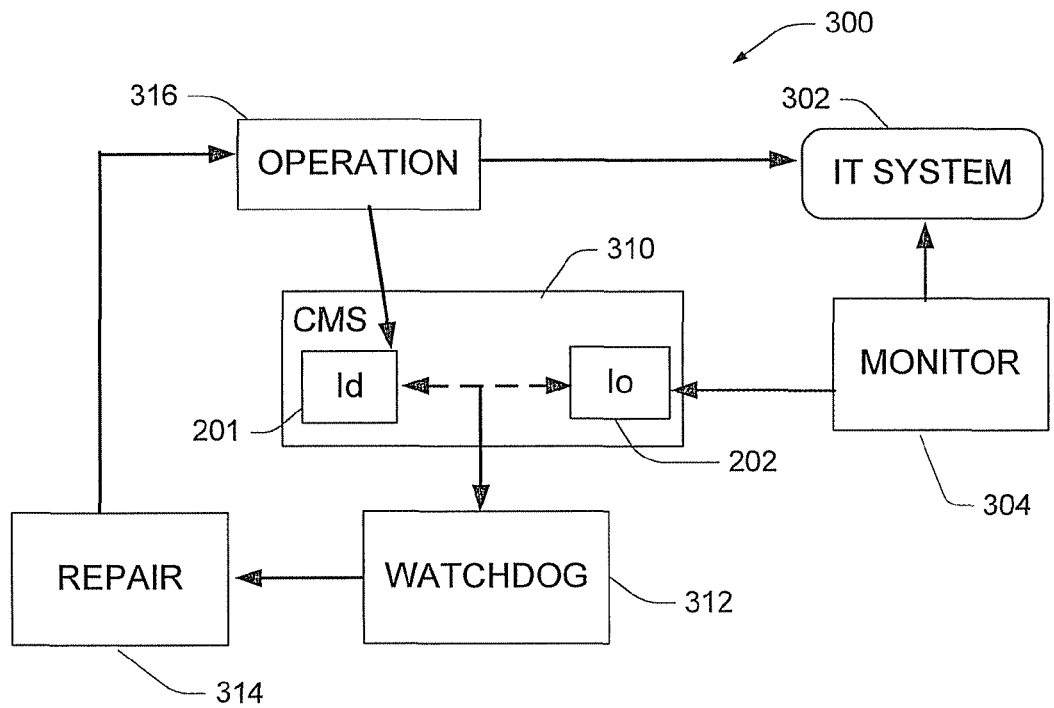
FIG. 7 is a block diagram illustrating an example of an IT service management system.
FIG. 8 is a table illustrating example watchdog notifications for the system illustrated in FIG. 7.

FIG. 7 illustrates a closed loop IT service management system and method in accordance with disclosed implementations. Aspects of the system 300 could be implemented with, for example, the computer system 100 illustrated in FIG. 1. The system 300 includes a Configuration Management System (CMS) 310 that stores a desired instance or state 201 and an observed instance or state 202 of a service model for an IT system 302. In some implementations, two representations of the model instances are stored: the desired and observed instances, and in other implementations a single model instance representation is stored having the two states. As noted above, with this arrangement model instance elements receive two values tagged as either desired or observed.

The model instance(s) and associated desired and observed states are stored, for example in the memory 120 illustrated in FIG. 1. A monitoring service 304 monitors the IT system 302 and reports the observed state 202 of the IT system 302 to the CMS 310. The CMS 310 compares the observed state 202 to the desired state 201, and if these states are inconsistent, the CMS 310 detects the inconsistency between the desired instance and the observed instance based on the comparison. If an inconsistency is detected, the system 300 can modify one or both of the desired state 201 and/or the observed state 202.

In the illustrated implementation, upon detection of an inconsistency the CMS 310 notifies a Watchdog Service 312. The watchdog service 312 is responsible for determining whether a detected inconsistency should be dealt with or not. For example, assuming that the service is exhibiting inconsistency because of high load, an operation to remedy could be one or more of the following:

A change to the service configuration to reduce or throttle or redirect demand;
  A change to the service's desired state to tolerate higher threshold(s);
  A change to the service to add resources to the service to service demand faster. Among others, this could take the form of adding CPU percentage to a virtual machine, or could take the form of adding another node to a tier.

In some implementations the default situation has the watchdog service 312 overseeing all of the CMS instances. However, it is also possible to configure the watchdog service 312 to ignore specific instances, in effect deactivating the closed loop. A "healthy" instance in the CMS 310 is in the lifecycle state Grounded and has its consistency state set to true. Upon inconsistency detection, the consistency state is updated to false and a notification sent to the watchdog service 312. The watchdog service 312 can decide to ignore the notification, record it but take no action, move the lifecycle state of the instance in the Watched state and take no further action or notifying a Repair Service 314.

The Watched state is a probation state in which the instance is deemed usable (an inconsistency has been detected) but under scrutiny. When moving an instance to the Watched state, the watchdog service 312 can trigger changes in the monitoring services such as requiring the deployment of complementary probes, changing the data collection frequency, etc. In some implementations, the CMS 310 not only notifies the watchdog service 312 when an inconsistency is detected, but also when an observed state returns to a consistent state. FIG. 8 is a simple table illustrating an example of when notifications are sent by the watchdog service 312, taken into consideration, whether an instance is being watched or not in one implementation.

Various control algorithms can be applied to determine when to move from the Watch state back to the Grounded state or to transition to the Repair state. For instance, a simple approach based on time would determine how long the instance was in the Watch state. If the instance spent "too long" in the Watch state then the repair service 314 gets notified. When being watched, it is possible that the instance returns to a consistent state without the need of repair action. In that case the watchdog service 312 would be notified and could decide to move back the instance to Grounded or keep it in a Watch state.

In some implementations, the Watched state is a global state that applies to an instance and not to instance elements. For example, an instance could have two attributes: responseTime and threadCount. A state inconsistency in responseTime might move the instance to the Watched state. Later, a threadCount inconsistency would also result in the notification. However, the CMS 310 does not record why the instance is in the Watched state (originally because of the responseTime), rather, this is done by the watchdog service 312.

Whereas Watched instances are still valid from the point of view of the binding process, the CMS 312 may prefer Grounded instances over Watched instances when ranking possible candidates. When the repair service 314 gets notified, it automatically moves the state of the instance to Repair. The instance is added to the list of instances to ignore by the watchdog service 312 so that further notifications are not received.

It is the responsibility of the repair service 314 to determine how to restore the state consistency. This can include determining the set of operations 316 to invoke in order to bring about this state. In some implementations, an operation declares a set of effects. Those effects are associated with changes in desired state 201. Therefore, when an operation 316 is invoked, the CMS 310 will first set the desired state 201 associated with the operation invoked in the target instance. It will then trigger the execution of the operation 316. If the operation invocation is successful, the instance is removed from the list of ignored instances in the watchdog 312. The close loop system is activated.

As the operation 316 is performed in the data center, changes will be made to the service. When the closed loop system is reactivated for that instance, new observed state 202 information is fed to the CMS 310 from the monitoring service 312. The operation 316 is successful if the observed state 202 is consistent with the desired state 201. If it is not, then the system will detect the inconsistency and will signal the watchdog 312.

Although specific implementations have been illustrated and described herein, it will be appreciated by those of ordinary skill in the art that a variety of alternate and/or equivalent implementations may be substituted for the specific implementations shown and described without departing from the scope of the present disclosure. This application is intended to cover any adaptations or variations of the specific implementations discussed herein. Therefore, it is intended that this disclosure be limited only by the claims and the equivalents thereof.

What is claimed is:

1. An information technology (IT) service management method, comprising:
   storing a desired instance of a service model, the service model specifying characteristics of an IT service;
   storing an observed instance of the service model;
   comparing the observed instance to the desired instance;
   detecting an inconsistency between the desired instance and the observed instance based on the comparison; and
   assigning, using a watchdog service and based on the detected inconsistency, a watched state to an instance of the service model associated with the desired instance and the observed instance, wherein the watched state indicates that the instance is usable but under scrutiny.

2. The method of claim 1, further comprising:
   modifying the desired instance in response to detecting the inconsistency.

3. The method of claim 1, further comprising:
   modifying the observed instance in response to detecting the inconsistency.

4. The method of claim 1, further comprising:
   determining when the detected inconsistency returns to a consistent state; and
   notifying the watchdog service when the detected inconsistency returns to the consistent state.

5. The method of claim 1, wherein the inconsistency includes at least one of a degradation of performance and a system failure.

6. The method of claim 1, wherein modifying the observed instance includes adding resources to the IT service.

7. The method of claim 1, wherein modifying the observed instance includes changing the IT service configuration.

8. The method of claim 1, further comprising:
   assigning a maximum amount of time that the instance of the service model can remain in the watched state; and
   assigning a repair state to the instance in response to determining that the instance was in the watched state for an amount of time exceeding the maximum amount of time.

9. The method of claim 1, further comprising:
   deploying complementary monitoring probes in response to the watched state being assigned to the instance.

10. The method of claim 1, further comprising:
    assigning a grounded state to the instance in response to determining that the inconsistency is no longer detected.

11. The method of claim 1, further comprising:
    deploying a complementary probe by a monitoring service in response to the watchdog service assigning the watched state to the instance.

12. An information technology (IT) service management system, comprising:
    a configuration management system (CMS) including a memory storing a desired instance of a service model;
    a monitoring service providing an observed instance of the service model to the configuration management system;
    wherein the configuration management system is configured to detect an inconsistency between the desired instance and the observed instance based on the comparison; and
    a watchdog service to assign, based on the detected inconsistency, a state to an instance of the service model associated with the desired instance and the observed instance, wherein the state is one of:
    a watched state indicating that the instance is usable but under scrutiny; and
    a repair state indicating that the instance is not usable.

13. The system of claim 12, further comprising:
    a repair service invoked in response to detection of the inconsistency by the CMS.

14. The system of claim 12, further comprising:
    the watchdog service invoked in response to detection of the inconsistency by the CMS.

15. The system of claim 12, further comprising the CMS to modify the observed instance in response to detection of the inconsistency.

16. The system of claim 12, further comprising the CMS to modify the desired instance in response to detection of the inconsistency.

17. A non-transitory computer readable medium storing instructions executable by a processing resource to cause a computer to:
    store a desired instance of a service model, the service model specifying characteristics of an Information Technology (IT) service;
    store an observed instance of the service model;
    compare the observed instance to the desired instance;
    detect an inconsistency between the desired instance and the observed instance based on the comparison; and assign, using a watchdog service and based on the detected inconsistency, a repair state to an instance of the service model associated with the desired instance and the observed instance, wherein the repair state indicates that the instance is not usable.

18. The medium of claim 17, further comprising instructions executable by a processing resource to cause a computer to:

modify the observed instance in response to detection of the inconsistency.

19. The medium of claim 18, wherein the instructions executable to modify the observed instance include instructions executable to invoke a repair service.

20. The medium of claim 19, further comprising instructions executable by a processing resource to cause a computer to:

disable the instructions to detect an inconsistency between the desired instance and the observed instance until the repair service has completed a repair of the detected inconsistency.

* * * * *